US012377571B2

(12) United States Patent
Hsu

(10) Patent No.: US 12,377,571 B2
(45) Date of Patent: Aug. 5, 2025

(54) COPY DEVICE FOR PROCESSING AND SHAPING A CYLINDRICAL ROD WITH A CURVED CONFIGURATION

(71) Applicant: Chun Jen Hsu, Taichung (TW)

(72) Inventor: Chun Jen Hsu, Taichung (TW)

( * ) Notice: Subject to any disclaimer, the term of this patent is extended or adjusted under 35 U.S.C. 154(b) by 387 days.

(21) Appl. No.: 18/110,728

(22) Filed: Feb. 16, 2023

(65) Prior Publication Data

US 2024/0278451 A1 Aug. 22, 2024

(51) Int. Cl.
*B27C 5/02* (2006.01)
*B27C 5/00* (2006.01)

(52) U.S. Cl.
CPC ................ *B27C 5/003* (2013.01); *B27C 5/02* (2013.01)

(58) Field of Classification Search
CPC ........ B27C 5/003; B23Q 35/04; B23Q 35/08; B23Q 35/10; B23Q 35/26; B23Q 35/28; B23Q 35/42; B27M 3/32; B23B 3/24; B23B 3/26; B23B 5/36; B23B 5/38
See application file for complete search history.

(56) References Cited

U.S. PATENT DOCUMENTS 5,127,452 A * 7/1992 Wilston .................... B27M 3/28 144/135.2
5,345,983 A * 9/1994 de Abreu .................. B27C 1/08 144/144.1
7,591,062 B2 * 9/2009 Rogers .................... B27C 7/005 144/1.1
2006/0157155 A1 * 7/2006 Robinson .................. B44B 3/02 144/136.95

* cited by examiner

*Primary Examiner* — Matthew Katcoff
(74) *Attorney, Agent, or Firm* — Bradley J. Thorson; DeWitt LLP

(57) ABSTRACT

A copy device for processing and shaping a cylindrical rod with a curved configuration includes a seat main body and a plane template. The seat main body is formed with an internal working space. The seat main body further has a reception opening in communication with the working space. A stock can be disposed in the working space and driven to rotate within the working space. The seat main body is arranged on a spindle moulder. A cutting tool of the spindle moulder can enter the working space through the reception opening. The plane template has a copy model. The cutting tool has a mould leaning section for leaning against the copy model, whereby the cutting tool can cut and process the stock to shape the stock with a configuration copied from the copy model.

7 Claims, 8 Drawing Sheets

COPY DEVICE FOR PROCESSING AND SHAPING A CYLINDRICAL ROD WITH A CURVED CONFIGURATION

BACKGROUND OF THE INVENTION

1. Field of the Invention

The present invention relates generally to woodworking machinery, and more particularly to a copy device, which is conveniently operable to quickly process and shape a cylindrical rod with a special curved configuration.

2. Description of the Related Art

In woodworking field, various cylindrical rods are applied to numerous structures and decorations, for example, chairs (such as Windsor chairs), cabinets, flagpoles, bats, rails, wooden nails, etc. A common woodworking factory can manufacture various cylindrical rods by means of a woodworking lathe, while a user can DIY manufacture various cylindrical rods or buy different cylindrical rods in the market. When a cylindrical rod with a special configuration (such as a conic curved configuration) is required, a cylindrical rod can be cut and processed with a woodworking lathe. However, the difficulty in manufacturing such cylindrical rod is quite high so that the processing work can be hardly performed by those who have insufficient experience in this field. Therefore, it is time-consuming to manufacture a cylindrical rod with a special configuration. As a result, the yield rate is low and the manufacturing efficiency is poor.

It is therefore tried by the applicant to provide a copy device for processing and shaping a cylindrical rod with a desired special curved configuration without using any lathe.

SUMMARY OF THE INVENTION

It is therefore a primary object of the present invention to provide a copy device for processing and shaping a cylindrical rod with a curved configuration. The copy device can be used to easily and quickly process and shape a stock with a desired special curved configuration.

To achieve the above and other objects, the copy device for processing and shaping a cylindrical rod with a curved configuration includes:

a seat main body having a bottom board and two sideboards disposed along two opposite edges of the bottom board, a working space extending in an axial direction being defined between the two sideboards, a reception opening being formed at a junction between the bottom board and one of the sideboards, the reception opening extending in the axial direction and communicating with the working space, the bottom board of the seat main body being slidably arranged on a working tabletop of a spindle moulder, a cutting tool vertically disposed on the working tabletop being permitted to pass through the reception opening and enter the working space, a transmission shaft being disposed on the seat main body, the transmission shaft having an output end extending in the axial direction and positioned in the working space and an input end opposite to the output end, the input end being connectable with a power tool for driving the output end to rotate, the outer end being connectable with a first end of a stock, a slider slidable in the axial direction being slidably disposed on the seat main body, the slider having an abutment member positioned in the working space opposite to the output end, the abutment member and the output end being coaxial with each other and having the same central axis, the abutment member serving to connect with a second end of the stock, whereby when the stock is driven by the output end, the stock can rotate around the central axis; and a plane template replaceably arranged in the working space, an outer edge of the plane template, which edge is directed to the reception opening, being formed with a copy model extending in the axial direction and positioned under the central axis, the cutting tool having a mould leaning section for leaning against the copy model, when the cutting tool enters the working space through the reception opening, the mould leaning section of the cutting tool being leant against the copy model and moved along the copy model, whereby the cutting tool can cut and process the stock disposed between the output end and the abutment member to shape the stock with a configuration copied from the copy model.

The present invention can be best understood through the following description and accompanying drawings, wherein:

DETAILED DESCRIPTION OF THE PREFERRED EMBODIMENTS

Figure 1:
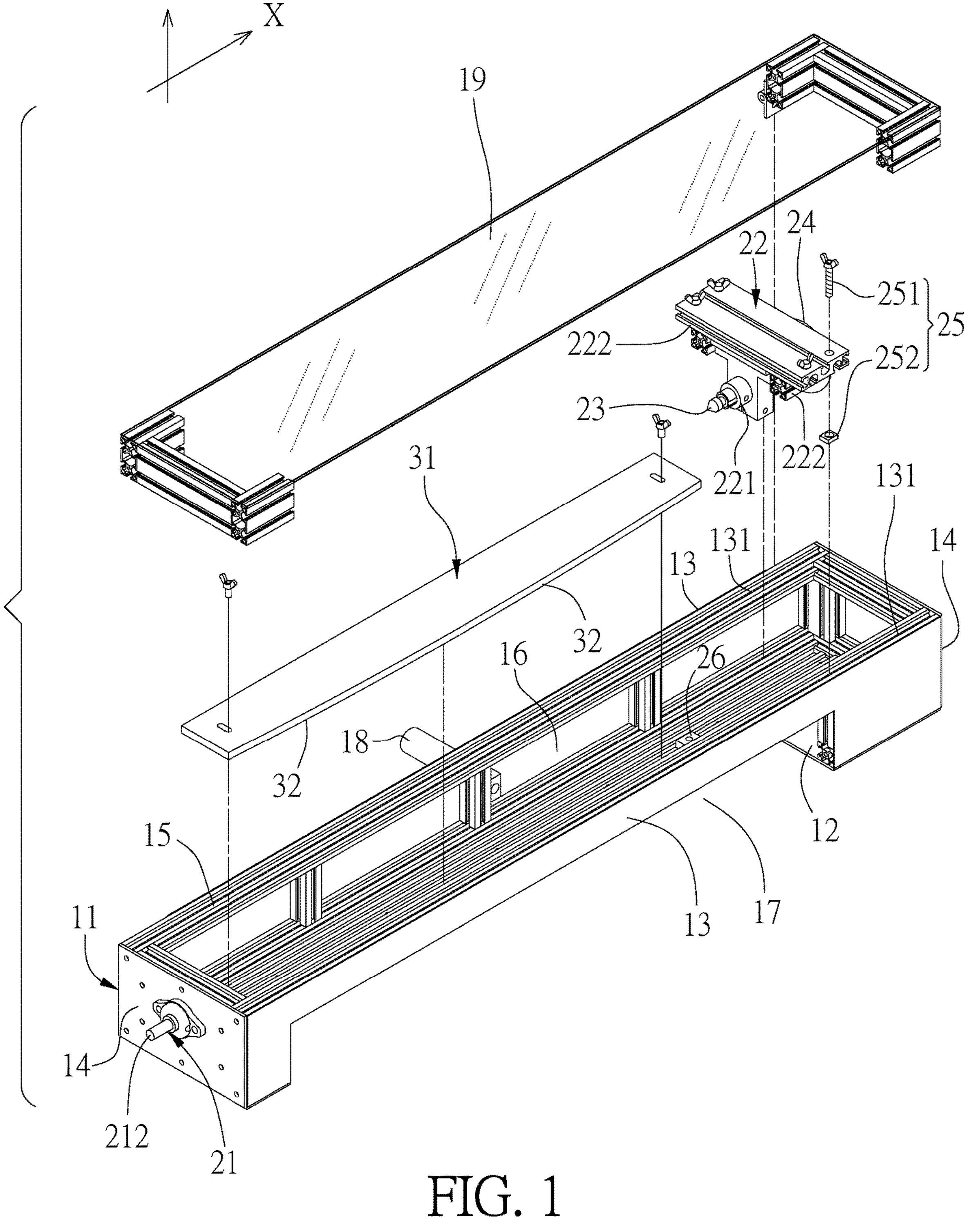
FIG. 1 is a perspective exploded view of the present invention.
Figure 2:
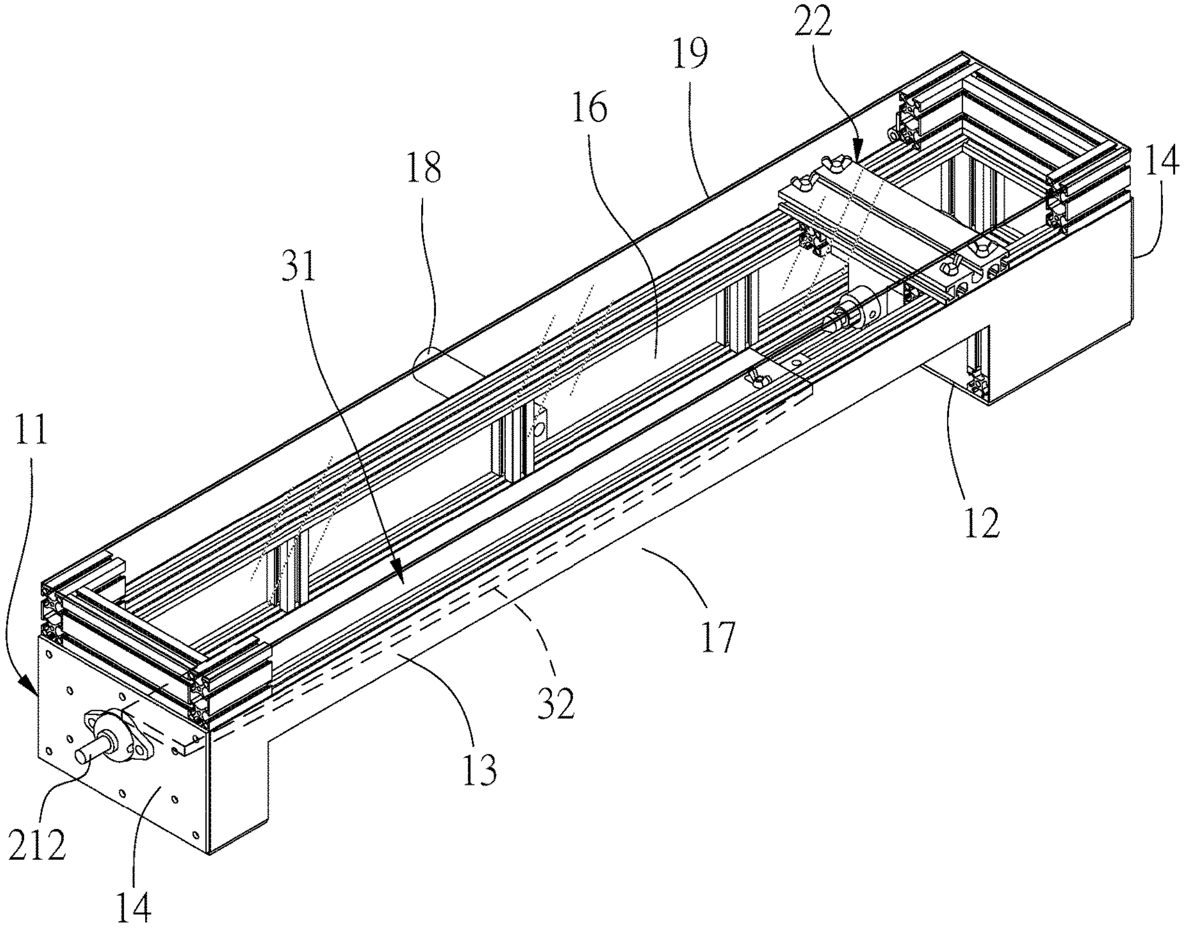
FIG. 2 is a perspective assembled view of the present invention.
Figure 3:
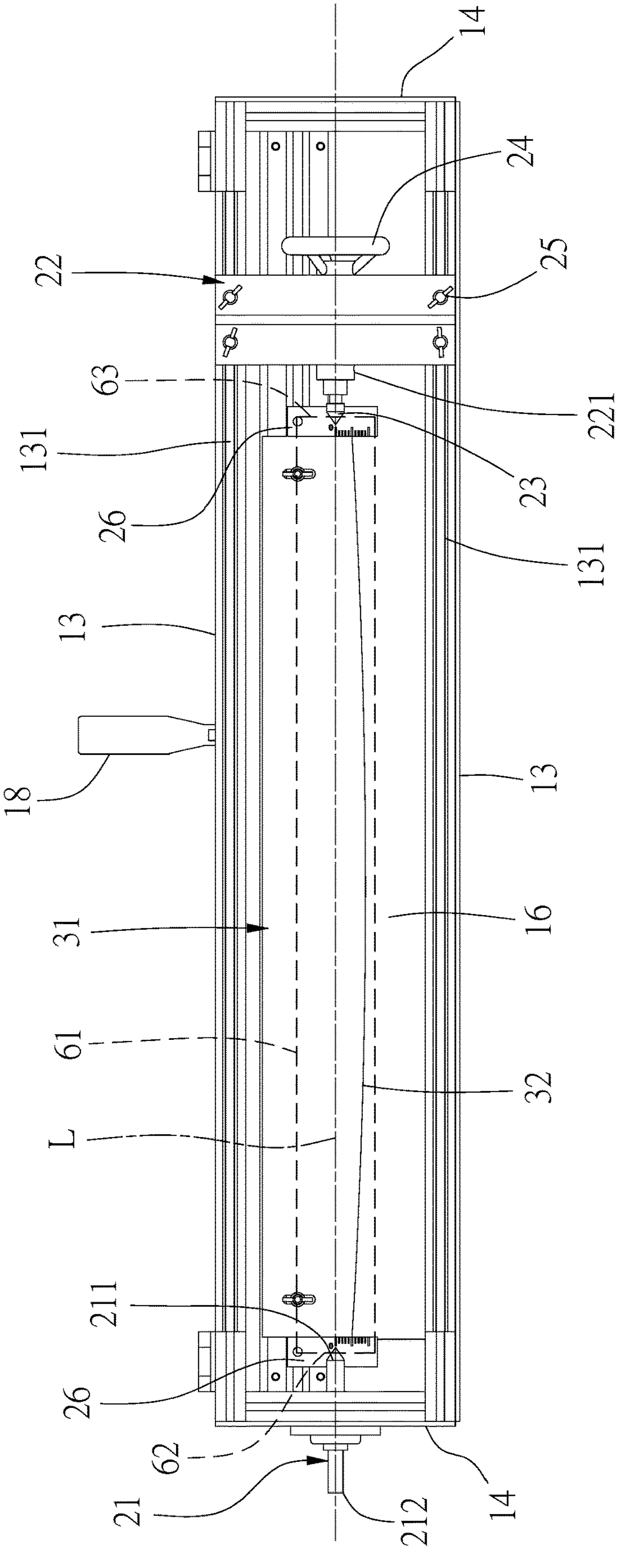
FIG. 3 is a top view of the present invention.
Figure 4:
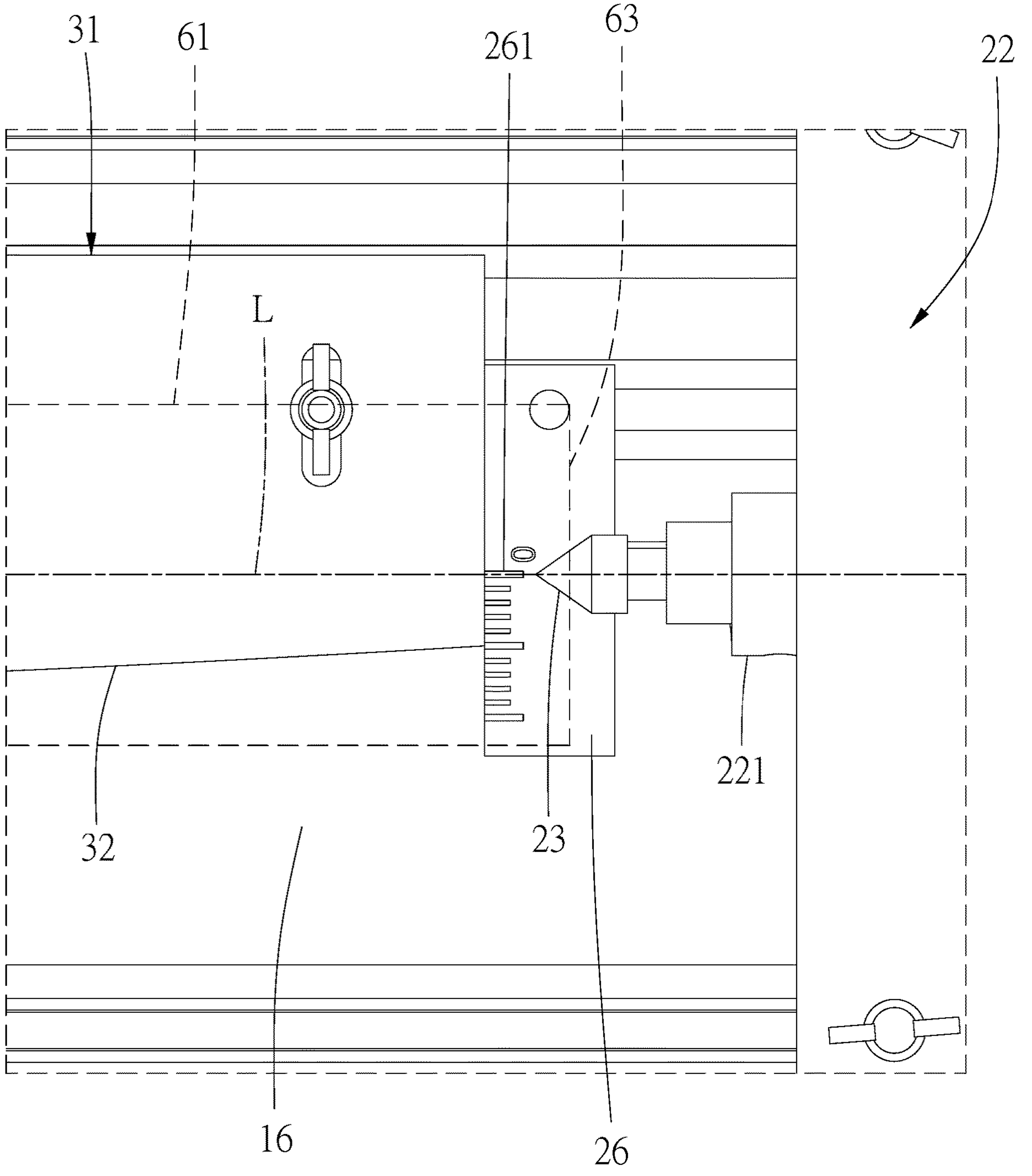
FIG. 4 is an enlarged view of a part of FIG. 3.
Figure 5:
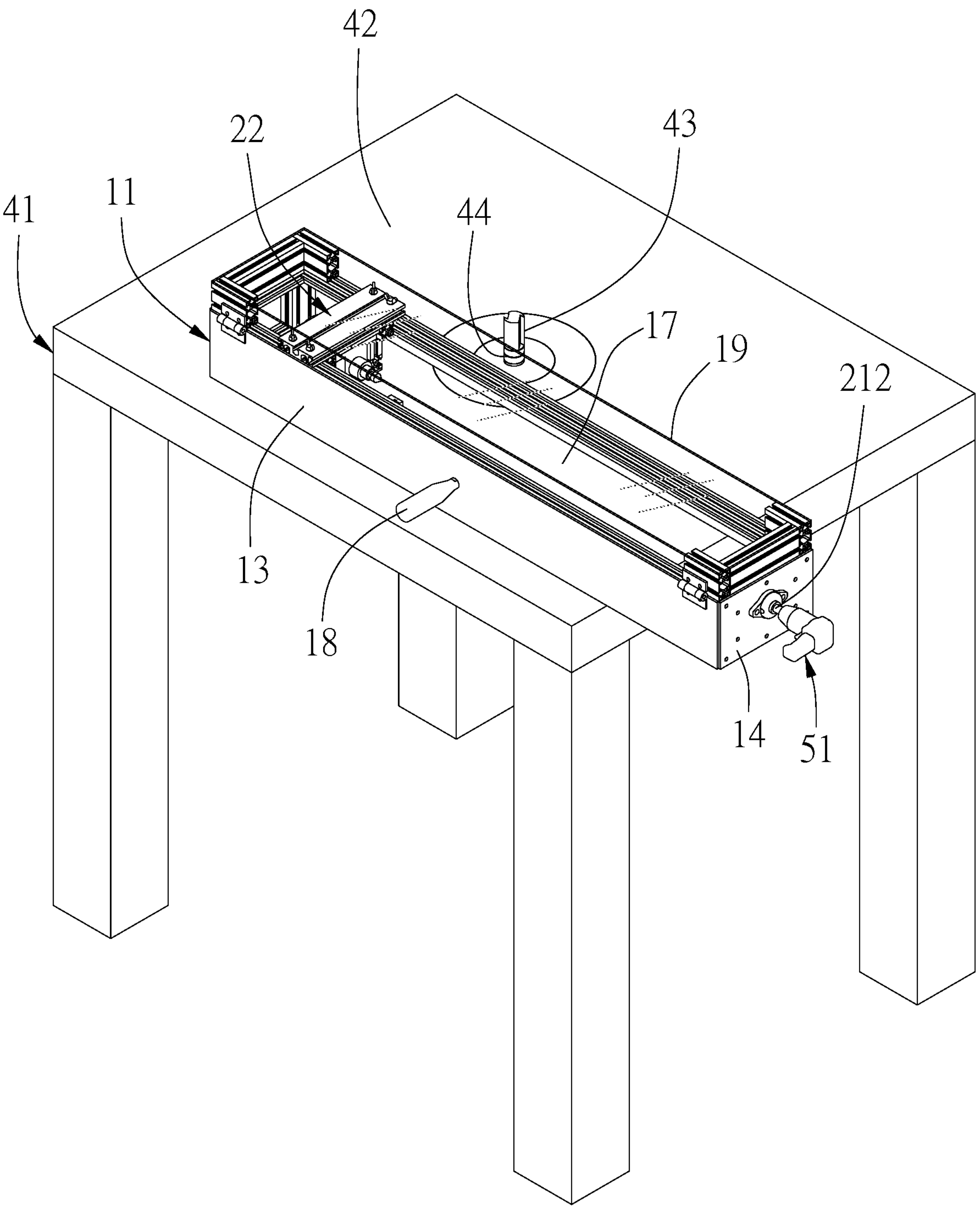
FIG. 5 is a perspective view showing that the present invention is used in cooperation with a spindle moulder and a power tool.
Figure 6:
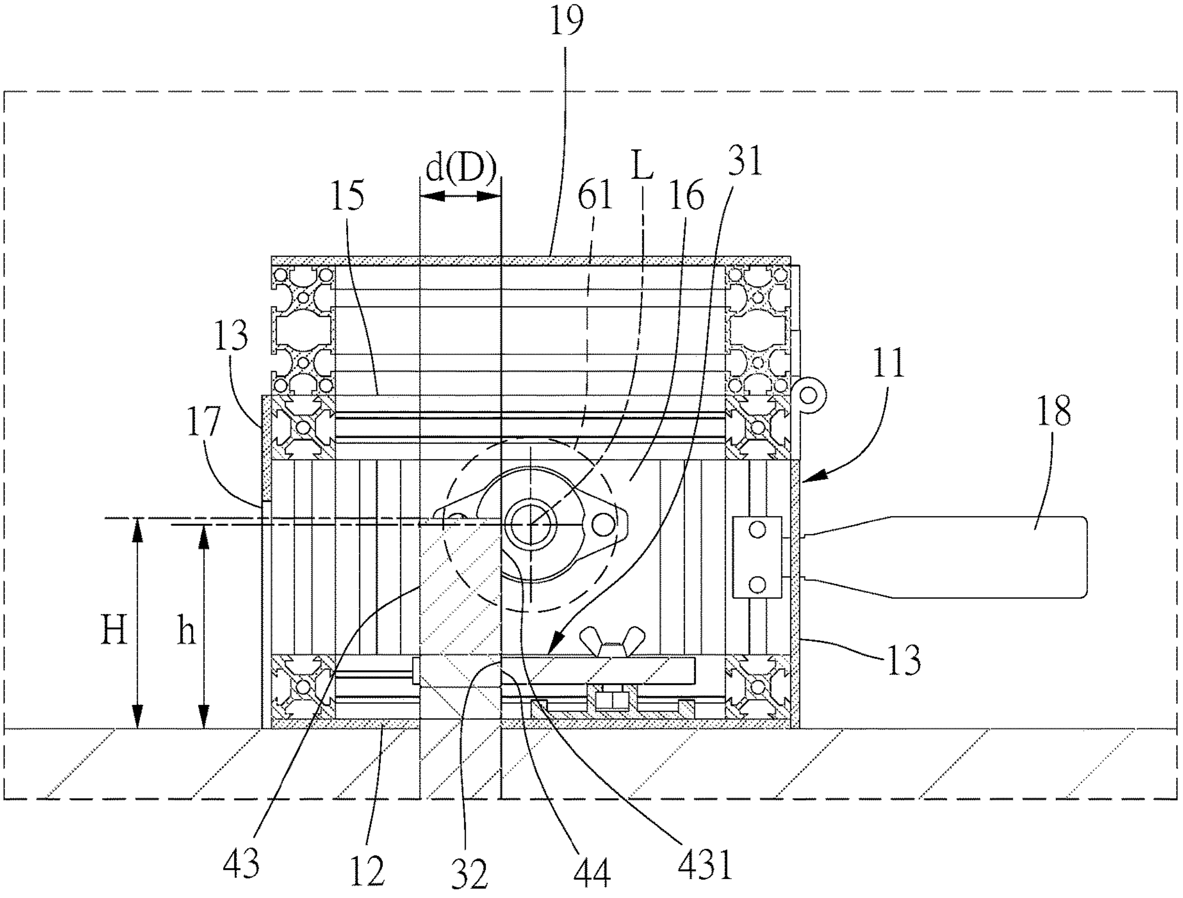
FIG. 6 is a view showing a using state of the present invention, in which the cutting tool enters the working space through the reception opening.

First, please refer to FIGS. 1~6. The present invention provides a copy device for processing and shaping a cylindrical rod with a curved configuration. The copy device mainly includes a seat main body 11 and a plane template 13.

The seat main body 11 has a rectangular bottom board 12 and further has two opposite sideboards 13 and two opposite end boards 14 respectively disposed along four edges of the bottom board 12. Accordingly, the seat main body 11 is in the form of a box body with an upper opening 15. A working space 16 extending in an axial direction X is defined between the two sideboards 13. A reception opening 17 is formed at a junction between the bottom board 12 and one of the sideboards 13. The reception opening 17 extends in the axial direction X and communicates with the working space 16. The bottom board 12 of the seat main body 11 is slidably arranged on a working tabletop 42 of a spindle moulder 41. A cutting tool 43 vertically disposed on the working tabletop 42 is permitted to pass through the reception opening 17 and enter the working space 16. Preferably, a handle 18 is disposed on the other sideboard 13 of the seat main body 11 without the reception opening 17. The handle

18 outward protrudes from the sideboard 13 for a human hand to hold so as to push/move the seat main body 11. In addition, a transparent cover plate 19 is pivotally disposed on the seat main body 11. The transparent cover plate 19 can be pivotally rotated to block the opening 15. A user can directly observe the processing condition in the working space 16 through the transparent cover plate 19. Also, during the successive processing procedure, the transparent cover plate 19 serves to prevent the cut chips produced in the processing procedure from blowing out through the opening 15.

A transmission shaft 21 is disposed on one of the end boards 14 of the seat main body 11. The transmission shaft 21 has an output end 211 extending in the axial direction X and positioned in the working space 16 and an input end 212 opposite to the output end 211. The input end 212 is exposed to outer side of the working space 16 and connectable with a power tool 51 (such as a commercially available power drill) for driving the output end 211 to rotate. The outer end 211 is connectable with a first end 62 of an elongated column-shaped stock 61 by way of abutment. A slider 22 slidable in the axial direction X is slidably disposed on top edges of the two sideboards 13 of the seat main body 11. The slider 22 has an abutment member 23 positioned in the working space 16 opposite to the output end 211. The abutment member 23 and the output end 211 are coaxial with each other and have the same central axis L. The abutment member 23 serves to connect with a second end 63 of the stock 61, whereby when the stock 61 is driven by the output end 211, the stock 61 can rotate around the central axis L. Preferably, the slider 22 has a threaded seat 221 arranged along the central axis L. The abutment member 23 is screwed in the threaded seat 221 and connected with a hand wheel 24 for driving the abutment member 23. When driven by the hand wheel 24, the abutment member 23 moves along the central axis L relative to the slider 22.

In this embodiment, the top edges of the two sideboards 13 are respectively formed with rail channels 131 extending in the axial direction X. Each of two lateral sides of the slider 22 is recessed to form a shoulder section 222. By means of the shoulder sections 222, the slider 22 is bridged between the top edges of the two sideboards 13, whereby the slider 22 is slidable along the top edges of the two sideboards 13. Two opposite locating assemblies 25 are disposed on the slider 22 to extend into the rail channels 131 of the two sideboards 13. Each of the locating assemblies 25 is composed of a bolt 251 passing through the slider 22 and a press block 252 positioned in the rail channel 131 and screwed with the bolt 251. By means of screwing the bolt 251, the press block 252 is driven and fastened in the rail channel 131 so as to locate the slider 22 in a true position after slid. In addition, a scale section 26 is disposed on an upper side of the bottom board 12, which side faces the working space 16. The scale section 26 has a stock center marking scale 261. The stock center marking scale 261 is positioned under the central axis L and aligned with the central axis L in parallel thereto.

The plane template 31 has the form of a plate and is replaceably arranged in the working space 16. An outer edge of the plane template 31, which edge is directed to the reception opening 17, is formed with a copy model 32 extending in the axial direction X and positioned under the central axis L. The cutting tool 43 upward protrudes from the working tabletop 42 by a height H. The height H is equal to or larger than a height h by which the central axis L is positioned. In addition, the cutting tool 43 has a mould leaning section 44 for leaning against the copy model 32. The mould leaning section 44 can be formed of at least one bearing fitted on the cutting tool 43. The mould leaning section 44 has an outer diameter D equal to an outer diameter d of a blade section 431 of the cutting tool 43. When the cutting tool 43 enters the working space 16 through the reception opening 17, the mould leaning section 44 of the cutting tool 43 is leant against the copy model 32. Then, when a user pushes the seat main body 11 to make the cutting tool 43 move along the copy model 32, the blade section 431 can cut and process the stock 61 disposed between the output end 211 and the abutment member 23 to shape the stock 61 with a configuration copied from the copy model 32. In practice, the user can directly DIY process the plane template 31 to shape the copy model 32 with various desired shapes. Accordingly, the stock 61 can be processed and shaped with various curved configurations in accordance with different requirements.

Figure 7:
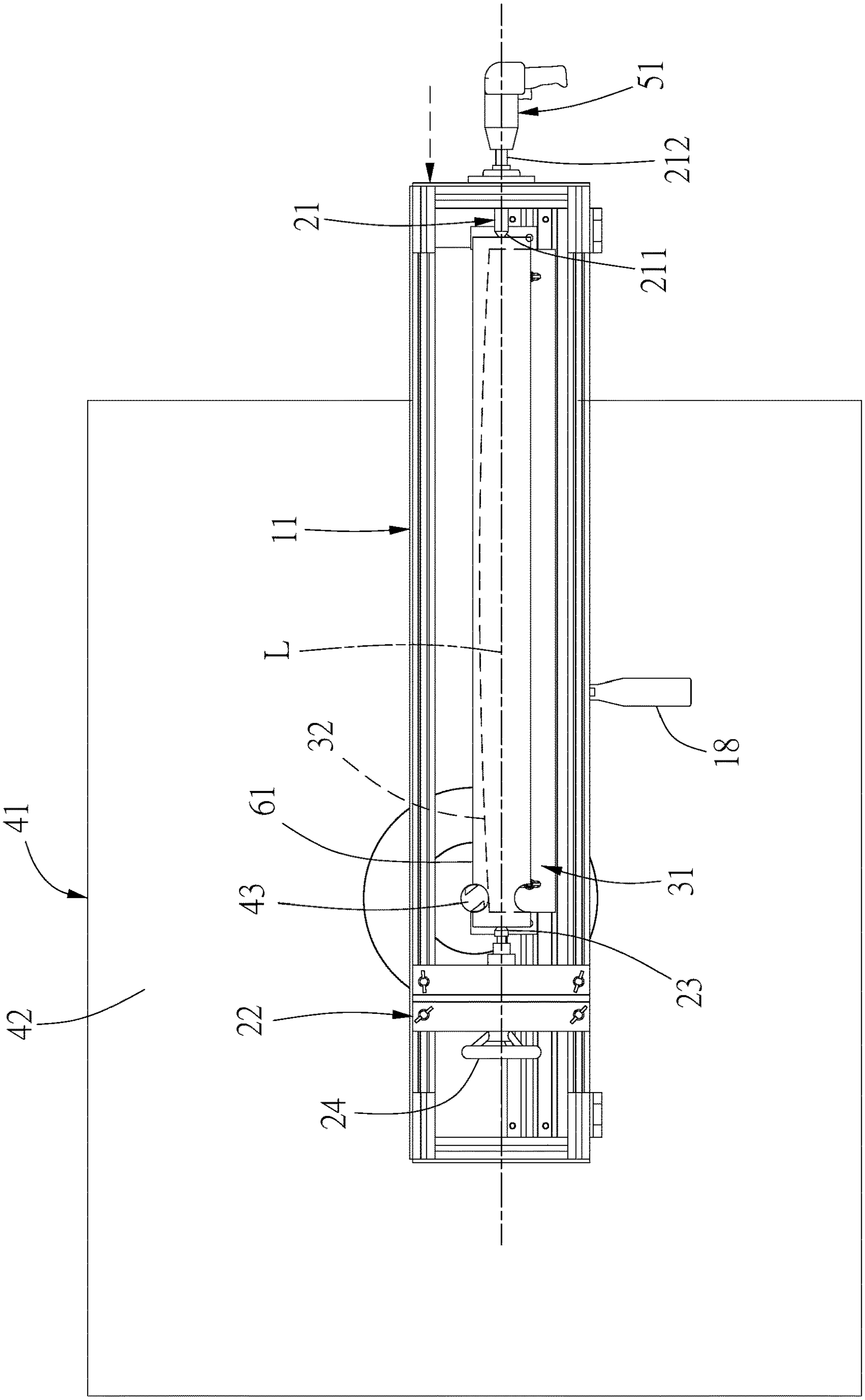
FIGS. 7 and 8 are views showing using states of the present invention, in which the cutting tool cuts and processes a stock to shape the stock with a curved configuration copied from a copy model.
Figure 8:
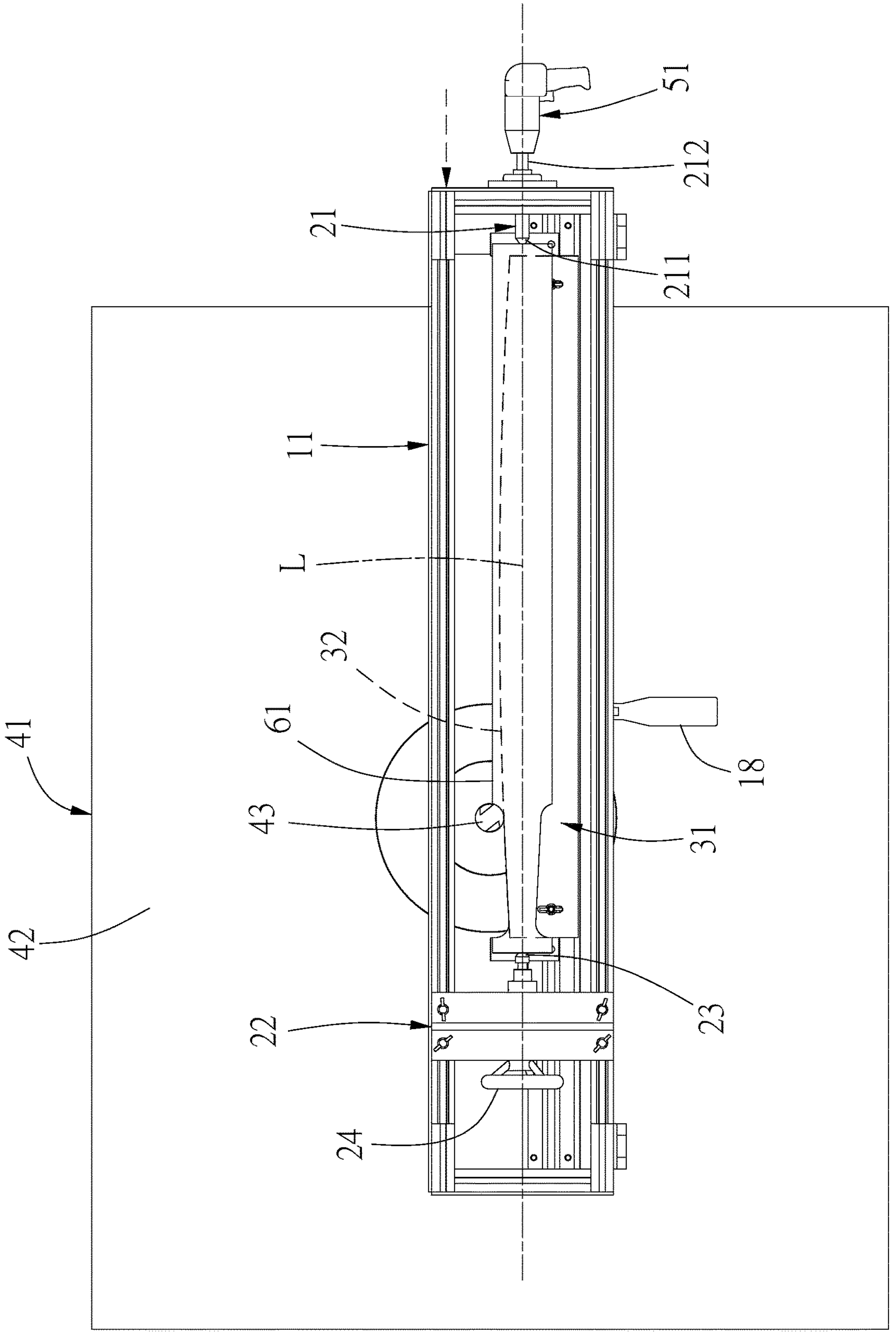

Please now refer to FIGS. 7 and 8. In practical use of the copy device of the present invention composed of the above structures, a user only needs to mount the plane template 31 with a preset copy model 32 into the working space 16 of the seat main body 11. By means of the previous measurement of the scale section 26, the user himself/herself can adjust the arrangement position of the plane template 3 so as to set an initial processing outer diameter of the stock 61. Then, the user can push and move the slider 22 by a longer distance. Thereafter, the user can use the hand wheel 24 to drive and displace the abutment member 23 so that two ends of the stock 61 are oppositely clamped between the output end 211 of the transmission shaft 21 and the abutment member 23. Accordingly, the stock 61 can be quickly mounted in the copy device. Then, the user only needs to hold the handle 18 with one hand and operate the power tool 51 with the other hand to connect the power tool 51 with the input end 212 of the transmission shaft 21 so as to supply rotational power for the stock 61. When the user pushes the seat main body 11 and makes the cutting tool 43 enter the working space 16 through the reception opening 17, the mould leaning section 44 of the cutting tool 43 in operation state is first leant against the copy model 32 and a lateral side of the scale section 26. Then, the user pushes the seat main body 11 to make the cutting tool 43 move along the copy model 32, whereby the stock 61 clamped between the output end 211 and the abutment member 23 can be precisely cut and processed and shaped with a curved configuration copied from the copy model 32.

According to the above description of the present invention, a user can directly DIY process the plane template 31 to form a desired copy model in accordance with a required curved configuration. Moreover, in practice, the user only needs to use the copy device of the present invention in cooperation with a conventional spindle moulder 41 and a conventional power tool 51 to easily and quickly process the stock 61 such as a cylindrical rod to shape the stock 61 with a desired special curved configuration. In addition, by means of the previous measurement of the cooperative scale section 26, the arrangement position of the plane template 3 can be adjusted so that the stock 61 can be precisely cut and shaped with a curved configuration copied from the copy model 32 of the plane template 31. Therefore, the present invention can effectively lower the difficulty in processing procedure and enhance the manufacturing efficiency.

The above embodiments are only used to illustrate the present invention, not intended to limit the scope thereof. Many modifications of the above embodiments can be made without departing from the spirit of the present invention.

What is claimed is:

1. A copy device for processing and shaping cylindrical rod with curved configuration, the copy device comprising:

a seat main body having a bottom board and two sideboards disposed along two opposite edges of the bottom board, a working space extending in an axial direction being defined between the two sideboards, a reception opening being formed at a junction between the bottom board and one of the sideboards, the reception opening extending in the axial direction and communicating with the working space, the bottom board of the seat main body being slidably arranged on a working tabletop of a spindle moulder, a cutting tool vertically disposed on the working tabletop being permitted to pass through the reception opening and enter the working space, a transmission shaft being disposed on the seat main body, the transmission shaft having an output end extending in the axial direction and positioned in the working space and an input end opposite to the output end, the input end being connectable with a power tool for driving the output end to rotate, the outer end being connectable with a first end of a stock, a slider slidable in the axial direction being slidably disposed on the seat main body, the slider having an abutment member positioned in the working space opposite to the output end, the abutment member and the output end being coaxial with each other and having the same central axis, the abutment member serving to connect with a second end of the stock, whereby when the stock is driven by the output end, the stock can rotate around the central axis; and a plane template replaceably arranged in the working space, an outer edge of the plane template, which edge is directed to the reception opening, being formed with a copy model extending in the axial direction and positioned under the central axis, the cutting tool upward protruding from the working tabletop by a height, which is equal to or slightly larger than a height by which the central axis is positioned, the cutting tool having a mould leaning section for leaning against the copy model, when the cutting tool enters the working space through the reception opening, the mould leaning section of the cutting tool being leant against the copy model and moved along the copy model, whereby the cutting tool can cut and process the stock disposed between the output end and the abutment member to shape the stock with a configuration copied from the copy model.

2. The copy device for processing and shaping a cylindrical rod with a curved configuration as claimed in claim 1, wherein a handle is disposed on the other sideboard of the seat main body without the reception opening, the handle outward protruding from the sideboard for a human hand to hold and push/move the seat main body.

3. The copy device for processing and shaping a cylindrical rod with a curved configuration as claimed in claim 1, wherein the bottom board is in the form of a rectangular board and the seat main body further has two end boards oppositely disposed on two other opposite edges of the bottom board, whereby the seat main body is in the form of a box body with an upper opening, the transmission shaft being disposed on one of the end boards, a transparent cover plate being additionally pivotally disposed on the seat main body, the transparent cover plate being pivotally rotatable to block the opening of the seat main body.

4. The copy device for processing and shaping a cylindrical rod with a curved configuration as claimed in claim 1, wherein a slider has a threaded seat arranged along the central axis, the abutment member being screwed in the threaded seat and connected with a hand wheel for driving the abutment member, whereby when driven by the hand wheel, the abutment member moves along the central axis relative to the slider.

5. The copy device for processing a cylindrical rod to form a curved configuration as claimed in claim 1, wherein top edges of the two sideboards are respectively formed with rail channels extending in the axial direction, each of two lateral sides of the slider being recessed to form a shoulder section, by means of the shoulder sections, the slider being bridged between the top edges of the two sideboards, whereby the slider is slidable along the top edges of the two sideboards, opposite locating assemblies being disposed on the slider to extend into the rail channels of the two sideboards, each of the locating assemblies being composed of a bolt passing through the slider and a press block positioned in the rail channel and screwed with the bolt, by means of screwing the bolt, the press block being driven and fastened in the rail channel so as to locate the slider in a true position after slid.

6. The copy device for processing and shaping a cylindrical rod with a curved configuration as claimed in claim 1, wherein a scale section is disposed on an upper side of the bottom board, which side faces the working space, the scale section having a stock center marking scale, the stock center marking scale being positioned under the central axis and aligned with the central axis in parallel thereto.

7. The copy device for processing and shaping a cylindrical rod with a curved configuration as claimed in claim 1, wherein the mould leaning section is formed of at least one bearing fitted on the cutting tool, the mould leaning section having an outer diameter equal to an outer diameter of a blade section of the cutting tool.

* * * * *